United States Patent [19]

Havens et al.

[11] Patent Number: 5,195,386
[45] Date of Patent: Mar. 23, 1993

[54] BRAKE LEVER ARRANGEMENT

[75] Inventors: Dale I. Havens, Addison; Roland L. von Kaler, Tecumseh, both of Mich.

[73] Assignee: Tecumseh Products Company, Tecumseh, Mich.

[21] Appl. No.: 796,059

[22] Filed: Nov. 20, 1991

[51] Int. Cl.⁵ .................................. F16D 55/2255
[52] U.S. Cl. ................... 74/411.5; 188/72.7; 188/72.9
[58] Field of Search .............. 188/72.7, 72.9; 74/411.5

[56] References Cited

U.S. PATENT DOCUMENTS

| | | | |
|---|---|---|---|
| 3,463,274 | 8/1969 | Hollnagel et al. | 188/72.7 |
| 3,499,508 | 3/1970 | Swift | 188/73 |
| 3,708,041 | 1/1973 | Hahn | 188/72.9 |
| 3,853,206 | 12/1974 | Kibler et al. | 188/72.9 |
| 3,878,921 | 4/1975 | Kibler et al. | 188/72.7 X |
| 4,102,440 | 7/1978 | Wood | 188/72.7 |
| 4,633,979 | 1/1987 | Edwards | 188/72.7 |
| 4,759,429 | 7/1988 | Margetts | 188/72.7 X |
| 4,844,227 | 7/1989 | Crawford et al. | 74/411.5 X |
| 4,903,546 | 2/1990 | Quintille | 74/411.5 X |
| 4,966,574 | 10/1990 | von Kaler et al. | 475/206 |
| 5,087,227 | 2/1992 | Giere et al. | 188/72.7 X |

FOREIGN PATENT DOCUMENTS

| | | | |
|---|---|---|---|
| 883624 | 10/1971 | Canada | 188/72.9 |
| 52-61677 | 5/1977 | Japan | 188/72.7 |
| 58-124832 | 7/1983 | Japan | 188/72.7 |

Primary Examiner—Allan D. Herrmann
Attorney, Agent, or Firm—Baker & Daniels

[57] ABSTRACT

The present invention is a brake lever arrangement for a small transmission. The brake mechanism is actuated by the rotational movement of the brake lever which causes friction pucks to move into the brake disc. A spring coupled to the brake lever biases the brake lever in a non-braking position and aligns the brake lever with its plane of rotation to prevent dragging of the friction pucks on the brake disc. Also, a bracket may be provided which has an elongated slot for receiving the upper portion of the brake lever. The bracket aligns the brake lever and guides the movement of the brake lever along one direction.

21 Claims, 2 Drawing Sheets

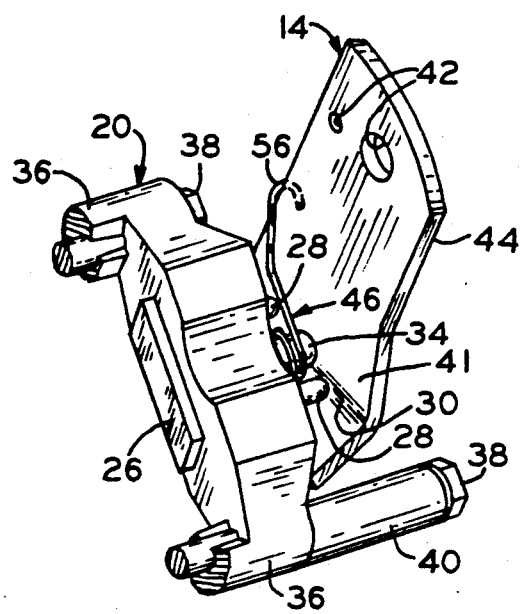
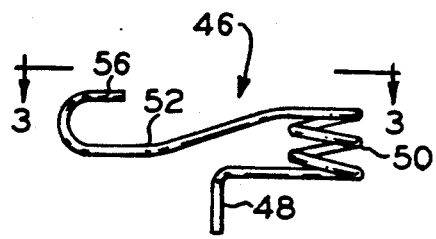
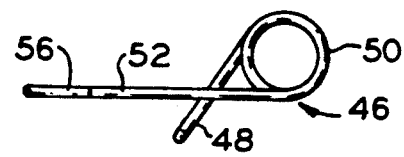
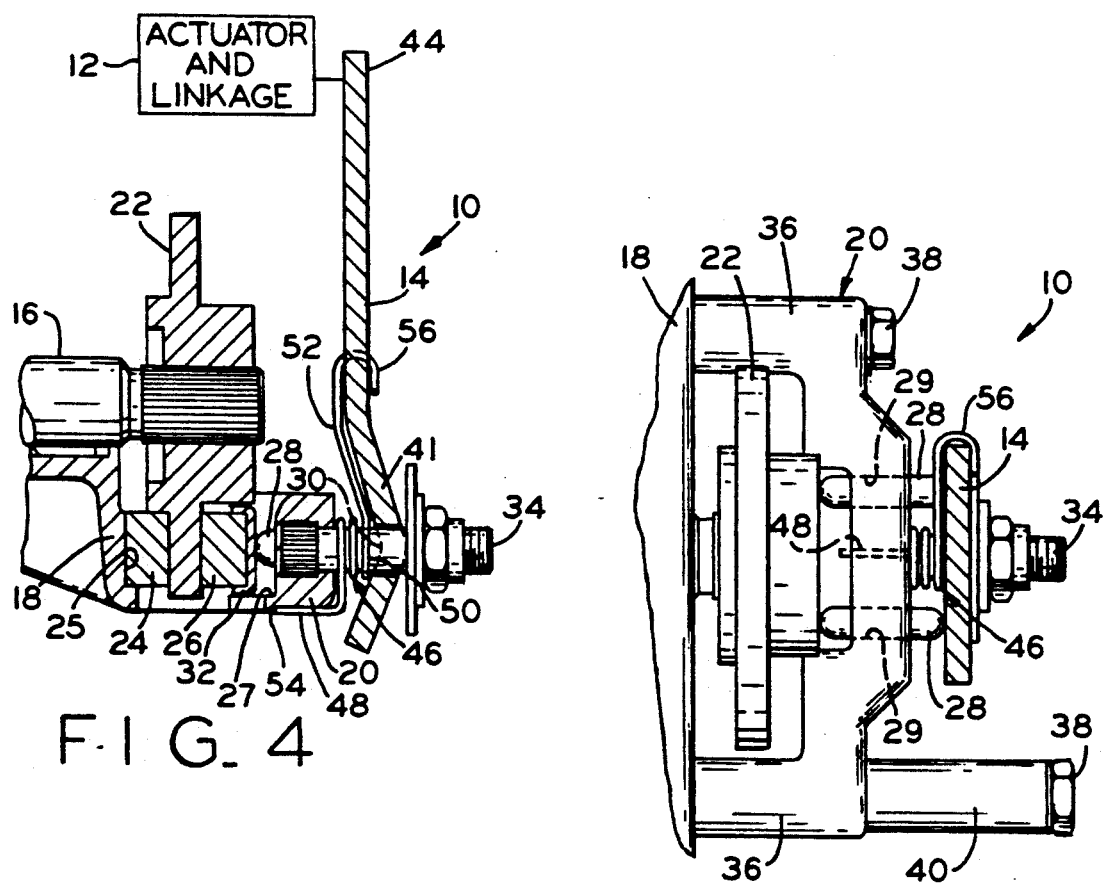

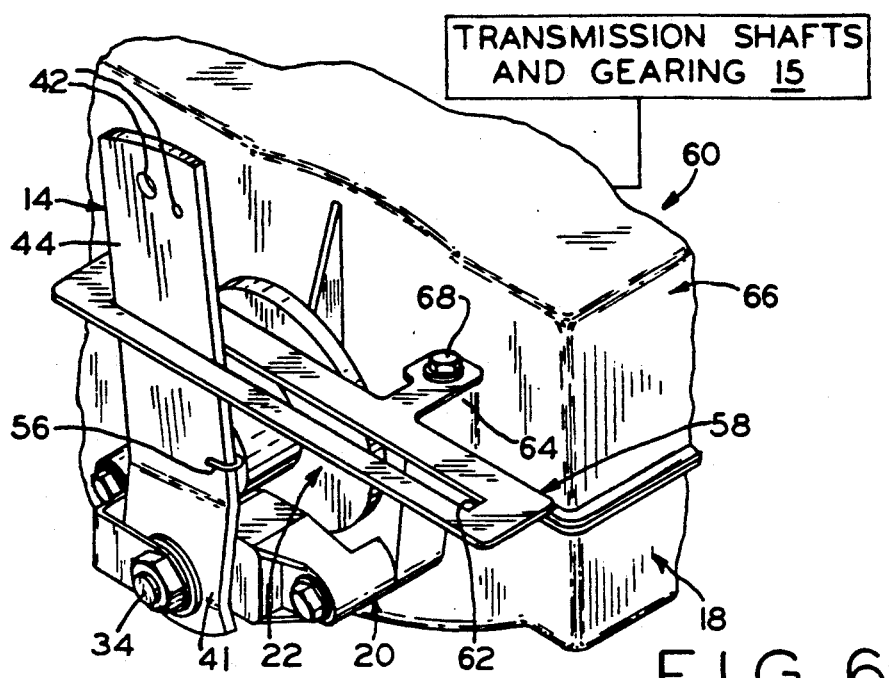
FIG_6
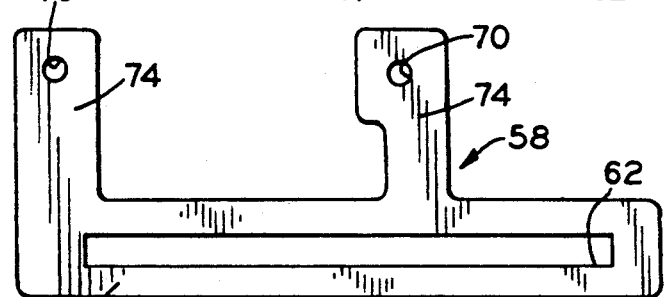
FIG_7
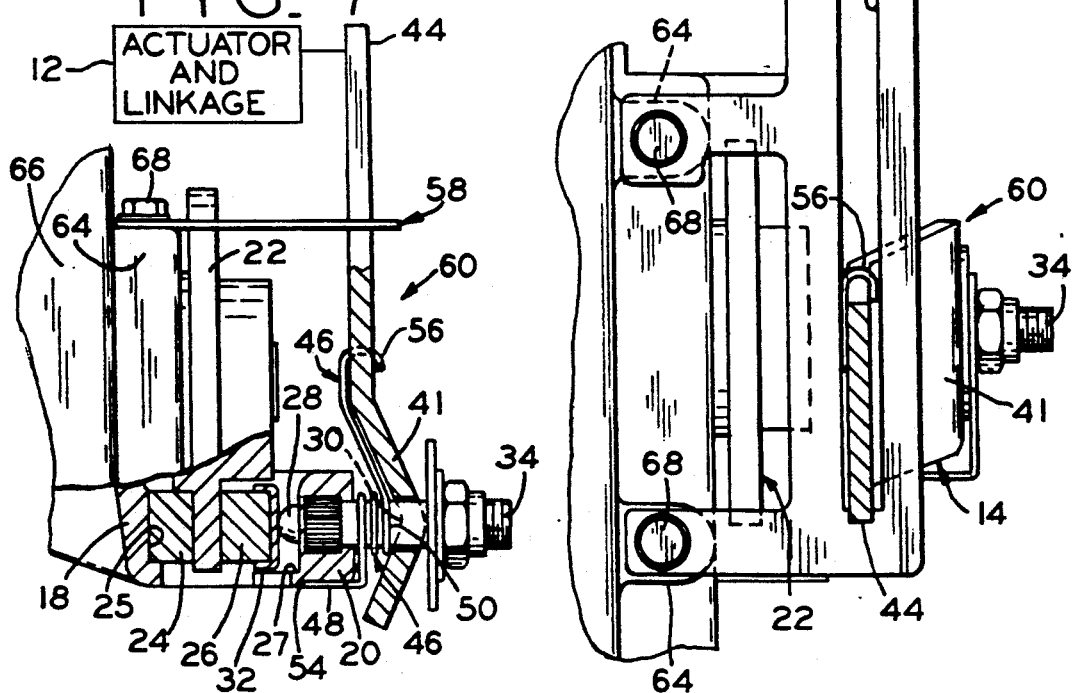
FIG_8    FIG_9

BRAKE LEVER ARRANGEMENT

BACKGROUND OF THE INVENTION

1. Field of the Invention

The present invention relates to brake systems of small transmissions used on riding lawn mowers and the like. In particular, the field of the invention is that of brake lever arrangements for such transmissions.

2. Prior Art

One prior art brake system, used in small transmissions for riding lawn mowers and the like, includes a brake disc which is rotatably coupled to one of the shafts of the drive train. The disc brake system also includes one or more pucks having friction surfaces which are pressed against the brake disc to retard the rotation of one of the drive train shafts and thereby slow the output speed of the transmission. One transmission utilizing a disc brake system is disclosed in U.S. Pat. No. 4,966,574, assigned to the assignee of the present invention, the disclosure of which is explicitly incorporated by reference.

In the brake system disclosed in the '574 patent, a pair of pins is slidably disposed in the housing and may be moved inwardly by brake lever thereby pressing the outer friction puck against the brake disc. The brake lever is pivotally mounted on the housing and includes a cam surface which engages the sliding pins. The interaction of the cam surface and the pins causes the pins to move inwardly and exert pressure on the outer friction puck.

The brake disc has a slight end play which permits it to move axially into abutment with the inner friction puck so that the brake disc is effectively squeezed between the friction pucks upon pivoting of the brake lever. Rotation of the brake disc is retarded when the brake lever is moved into an actuated position, because the cam surface moves the pins which causes the friction pucks to be pressed together and trap the brake disc. The position of the brake lever determines the pressing force of the brake pins and thereby the amount of stopping torque exerted on the brake disc.

However, a problem with any disc brake system is that the brake lever may not return to a position which totally releases the brake disc due to the brake lever's alignment with the vehicle controls. Typically, vehicle controls include a manually operated pedal or lever connected by linkage to the brake lever which is used to actuate and deactivate the application of braking force. The brake lever and the linkage may be connected slightly askew wherein when the linkage releases the brake lever, the brake lever does not move completely to the unactuated position. Further, the brake lever may not align with a plane perpendicular to the axis of the brake lever pivot when in the unactuated position, and thereby keep the pins pressing against the outer friction puck.

The manually operated pedal is often connected to a spring mechanism or other arrangement so that when the operator terminates application of braking force, the brake pedal returns to an unactuated position. However, the spring mechanism moves only the pedal to its original position. The spring mechanism does not positively move and align the brake lever so that the brake lever and the linkage may remain in a skewed arrangement.

Such a skewed arrangement may result in the brake lever returning to a position in which the brake puck drags on the brake disc. This dragging may result from the failure of the actuating mechanism to move the brake lever completely back to the unactuated position. Alternatively, dragging may result from the brake lever being misaligned relative to the plane of rotation which is generally perpendicular to the axis of the brake lever such that the brake pins continue to press the friction pucks into the brake disc. In either circumstance, undesirable frictional contact continues between the friction pucks and the brake disc after the manually operative control has returned to the unactuated position.

This frictional contact generates heat which wears the brake pucks and may require more frequent replacement than brake pucks which are not subject to such frictional contact. Also, dragging creates frictional contact between the puck and disc which may result in a slight slowing of the speed of the transmission.

What is needed is a brake for a small transmission which completely disengages the brake mechanism.

Also needed is a brake for a small transmission which positively moves the brake lever to a non-braking position.

A further need is for brake for a small transmission which is inexpensive to manufacture.

An additional need is for a brake which aligns the brake lever with the plane of rotation.

SUMMARY OF THE INVENTION

The present invention provides a brake lever arrangement which minimizes the incidence of the brake pucks dragging on the brake disc. The brake lever is aligned with the plane of rotation and biased to a non-braking position so that when the brake is not actuated, the brake lever is returned to a position in which the brake pucks do not frictionally contact the brake disc. Further, the arrangement of the present invention requires only minimal modification to existing brake mechanisms.

The brake lever is provided with a torsion spring which engages the housing and also engages the brake lever at a position spaced from the pivot axis of the brake lever. The spring biases the brake lever to a predetermined radial disposition on the pivot which corresponds with the non-braking position. By engaging the brake lever at a position spaced from the brake lever pivot, the brake lever is aligned to a predetermined position relative to a plane perpendicular to the axis of the brake lever pivot. The biasing and alignment of the spring minimizes dragging of the brake pucks, thus extending their working life.

An additional bracket having an elongated slot may be attached to the housing adjacent to the brake mechanism. The slot receives the upper portion of the brake lever, and thereby further stabilizes the alignment of the brake lever. The bracket also provides a positive stop against any forces pulling the brake lever out of alignment and guides the movement of the brake lever in only one direction for smoother operation of the braking mechanism.

The present invention is, in one form, a transmission comprising a housing, a plurality of shafts rotatably disposed in the housing with a mechanism for operably connecting the shafts, a brake mechanism, and a guiding and aligning mechanism. The brake mechanism is connected to the housing and operates on one of the shafts. A brake lever is included in the brake mechanism for applying the braking force. The guiding and aligning mechanism causes the brake lever to be biased in a desired plane of rotation whereby when upon cessation of application of braking force, the brake lever tends to return to an unactuated, aligned position.

One object of the present invention is to provide a brake for a small transmission which completely disengages the brake mechanism.

Also an object is to provide a brake for a small transmission which positively moves the brake lever to a non-braking position.

A further object is provide a brake for a small transmission which is inexpensive to manufacture.

An additional object is to provide a brake which aligns the brake lever.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of a brake lever mounting and tension spring according to the present invention.

FIG. 2 is a top plan view of the tension spring.

FIG. 3 is a side view, taken along view lines 3—3 of FIG. 2.

FIG. 4 is side view of the brake system of the present invention.

FIG. 5 is a top view of the brake system of the present invention.

FIG. 6 is a perspective view of a second embodiment of the present invention.

FIG. 7 is a top plan view of the brake lever guide bracket.

FIG. 8 is a side view of the second embodiment including the spring.

FIG. 9 is a top view of the second embodiment including the spring.

Corresponding reference characters indicate corresponding parts throughout the several views. The exemplifications set out herein illustrates preferred embodiments of the invention, in several forms, and such exemplifications are not to be construed as limiting the scope of the invention in any manner.

DESCRIPTION OF THE PREFERRED EMBODIMENT

The present invention relates to brake mechanism 10 shown in FIGS. 4 and 5. Brake mechanism 10 may be formed as a component of an in-line transmission having transmission shafts and gearing 15 (FIG. 6) such as that disclosed in U.S. Pat. No. 4,966,574, for a riding lawn mower or the like. The riding lawn mower has actuating mechanism 12 which includes a manually operable lever or pedal and linkage for connecting the lever or pedal to brake lever 14 of brake mechanism 10.

Brake mechanism 10 provides braking force to brake shaft 16 to thereby slow the output speed of the transmission. Lower transmission housing 18 and brake housing 20 partially surround brake disc 22 which is splined to and rotates with brake shaft 16. Inner and outer brake pucks 24 and 26, respectively, are disposed within respective recesses 25 and 27 of housings 18 and 20 on both sides of brake disc 22. Brake pins 28 are disposed within apertures 29 of brake housing 20 and have ends abutting cam surface 30 of brake lever 14 and plate 32 which is adjacent to outer friction puck 26. Brake lever 14 is mounted and rotatable on mounting bolt 34 of brake housing 20 so that when brake lever 14 is rotated, cam surface 30 engages brake pins 28 and thereby presses outer friction puck 26 inwardly towards brake disc 22. A slight end play permits brake disc 22 to move into inner friction puck 24 such that brake disc 22 is in effect squeezed between friction pucks 24 and 26 upon movement of brake lever 14. Rotation of brake disc 22 is thus retarded so that the rotation of brake shaft 16 and the output speed of the transmission is likewise slowed.

As shown in FIG. 1, brake housing 20 may be separate from lower housing 18. Brake housing 20 includes mounting portions 36 having inner bores (not shown) receiving bolts 38 which attach brake housing 20 to lower transmission housing 18. Bolt extension 40 may also be provided on one or more of mounting portions 20. Brake housing 20 also includes internal apertures 29 for receiving brake pins 28 and an internal recess 27 for housing friction puck 26 and plate 32. Mounting bolt 34 is integrally attached to housing 20 and provides an attachment location for lower portion 41 of brake lever 14 which allows pivoting of brake lever 14 about an axis generally defined by mounting bolt 34. Attachment holes 42 are located in upper portion 44 of brake lever 14, and provide an attachment location for the linkage of actuator 12.

The detachable brake housing 20 facilitates replacement of friction pucks 24 and 26. Outer friction puck 26 may be replaced by detaching brake housing 20 from lower transmission housing 18 and removing puck 26 from recess 27 of housing 20. Inner friction puck 24 ma be replaced by detaching brake housing 20 from lower transmission housing 18, removing brake disc 22 from brake shaft 16, and removing puck 24 from recess 25 of housing 18.

Alternatively, brake housing 20 may be integrally formed with lower transmission housing 18 in an arrangement as disclosed in copending application entitled "BRAKE FOR TRANSMISSION", filed on Feb. 27, 1991, U.S. Pat. application Ser. No. 07/661,907, now abandoned, assigned to the assignee of the present invention, the disclosure of which is explicitly incorporated. Further, brake disc 22 may be formed with one portion being thicker than the other portion for improved braking performance as disclosed in copending application entitled "TRANSMISSION BRAKE HAVING IMPROVED STOPPING TORQUE", filed on Jul. 5, 1991, U.S. Pat. application Ser. No. 07/726,042, assigned to the assignee of the present invention, the disclosure of which is explicitly incorporated.

In accordance with the present invention, torsion spring 46 is operably connected with brake lever 14 to bias brake lever 14 rotationally and to align brake lever 14 with the plane of rotation. Spring 46 includes base portion 48, coil portion 50, and extending portion 52. Base portion 48 protrudes downwardly and engages the bottom of brake housing 20, which may include slot 54 for receiving base 48. Coil portion 50 is disposed around mounting bolt 34 between brake housing 20 and brake lever 14. Extending portion 52 projects upwardly adjacent to one side of brake lever 14 and has finger 56 which wraps around upper portion 44.

The spring tension of coil portion 50 biases the rotational position of brake lever 14 to its disengaged position by the wrapped around connection of finger 56 of extending portion 52. The abutment of extending portion 52 with the one side of upper portion 44 aligns brake lever 14, and the wrapped connection allows extending portion 52 to resist forces from any direction which urge brake lever 14 out of alignment. Further, extending portion 52 tends to cause brake lever 14 to move in only one direction when actuated, the direction directly opposed by spring tension of coil portion 50. Thus, spring 46 provides dual functionality by both rotationally biasing and aligning brake lever 14 against lateral forces.

In accordance with a second embodiment of the present invention shown in FIGS. 6–9, guide bracket 58 may be provided on brake mechanism 60, alone (as in FIG. 6) or in combination with spring 46 (as in FIGS. 8 and 9). Guide bracket 58 includes elongated slot 62 which receives upper portion 44 of brake lever 14 and thereby aligns lever 14 and guides its movement along the direction of slot 62 which is aligned with the plane of desired rotation of lever 14. Slot 62 has a width which allows brake lever 14 to move between an unactuated position and a fully actuated position. However, slot 62 has a thickness which is slightly greater than the thickness of brake lever 14, and further brake lever 14 has a thickness in a second direction which is significantly greater than its thickness in the first direction. With this arrangement, brake lever 14 has little play in its alignment so that brake lever 14 is positioned generally in a plane perpendicular to the axis of mounting bolt 34.

Bracket 58 is mounted at mounting positions 64 of upper transmission housing 66 by means of bolts 68 which extend through holes 70 and engage mounting positions 64. In the exemplary embodiment shown in FIG. 7, bracket 58 includes slotted portion 72 and two arms 74 which extend from slotted portion 72. Slotted portion 72 includes slot 62, while arms 74 include holes 70. Arms 74 are spaced apart so that brake disc 22 may extend above the plane of bracket 56 between arms 74 while arms 74 support slotted portion 72 in a position wherein slot 62 generally is located in the plane which is perpendicular to the axis of mounting bolt 34 and which contains brake lever 14. This placement of bracket 58 provides support for upper portion 44 of brake lever 14, while still allowing linkage from actuator 12 to connect with attachment holes 42 of brake lever 14. Because mounting positions 36 are easily formed in upper transmission housing 66, bracket 58 may be included to guide and align brake lever 14 without significantly changing the design of housing 66.

Spring 46 is made of a standard spring material and has a spring tension which is compatible with the forces which may be applied by linkage of actuator 12. Further, spring 46 should be manufactured so that its rest position corresponds to the non-actuated position of brake lever 14. Bracket 58 is made of conventional steel and has slot 62 with a length which depends on the range of motion needed to move between the non-actuated and fully actuated positions.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
    a housing;
    a plurality of shafts rotatably disposed in said housing;
    means for operably connecting said shafts;
    a pivot attached to said housing;
    braking means for applying braking force to one of said shafts, said braking means connected to said housing and operable on one of said shafts, said braking means including a brake lever for applying the braking force, said braking means including means for actuating said brake lever, said brake lever including a lower portion mounted on said pivot and an upper portion attached to said actuating means; and
    means for guiding and aligning said brake lever in a desired plane of rotation, said guiding means including a bracket operatively associated with said brake lever upper portion, whereby when upon said actuating means discontinuing application of braking force, said brake lever upper portion tends to return to an unactuated, aligned position.

2. The transmission of claim 1 wherein said bracket is mounted on said housing, and said bracket includes an elongated slot through which said brake lever upper portion extends.

3. The transmission of claim 2 wherein said bracket slot allows said brake lever to move substantially in only one direction.

4. The transmission of claim 3 wherein said brake lever has a thickness in a first direction about the thickness of said bracket slot, and said brake lever has a thickness in a second direction substantially greater than the thickness of said bracket slot whereby said brake lever is secured in an aligned position within said bracket slot.

5. The transmission of claim 1 wherein said guiding means includes a torsion spring engaging said brake lever.

6. The transmission of claim 5 wherein said spring biases said brake lever to an unactuated and aligned position whereby no braking force is applied.

7. The transmission of claim 6 wherein said spring provides substantially less resistance to movement in one direction from said unactuated position than said spring provides to movement in other directions whereby said brake lever is biased to move substantially in only said one direction.

8. The transmission of claim 1 wherein said braking means includes a brake disc rotationally attached on said one shaft, a friction puck disposed on a side of said disc, and means for pressing said friction puck against said disc, said pressing means operably connected to said brake lever whereby movement of said brake lever actuates said pressing means and presses said friction puck against said disc to thereby apply braking force.

9. The transmission of claim 8 wherein said brake lever includes a cam surface and said pressing means includes a brake pin disposed between said friction puck and said cam surface, whereby upon movement of said brake lever said brake pin is pressed into said friction puck by said cam surface.

10. A transmission comprising:
    a housing;

a plurality of shafts rotatably disposed in said housing;

means for operably connecting said shafts;

a pivot attached to said housing;

braking means for applying braking force to one of said shafts, said braking means connected to said housing and operable on one of said shafts, said braking means including a brake lever for applying the braking force, said braking means including means for actuating said brake lever, said brake lever including a lower portion mounted on said pivot and an upper portion attached to said actuating means;

means for guiding and aligning said brake lever in a desired plane of rotation, said guiding means including a bracket operatively associated with said brake lever upper portion; and means for biasing said brake lever upper portion to an unactuated position whereby when upon said actuating means discontinuing application of braking force, said brake lever upper portion returns to said unactuated position.

11. The transmission of claim 10 wherein said biasing means includes a spring engaging said brake lever.

12. The transmission of claim 11 wherein said spring provides substantially less resistance to movement in one direction from said unactuated position than said spring provides to movement in other directions whereby said brake lever is biased to move substantially in only said one direction.

13. The transmission of claim 10 wherein said braking means includes a brake disc rotationally attached on said one shaft, a friction puck disposed on a side of said disc, and means for pressing said friction puck against said disc, said pressing means operably connected to said brake lever whereby movement of said brake lever actuates said pressing means and presses said friction puck against said disc to thereby apply braking force.

14. The transmission of claim 13 wherein said brake lever includes a cam surface and said pressing means includes a brake pin disposed between said friction puck and said cam surface, whereby upon movement of said brake lever said brake pin is pressed into said friction puck by said cam surface.

15. The transmission of claim 10 wherein said pivot includes a mounting bolt integrally disposed in said housing, and said brake lever lower portion is pivotally secured about said mounting bolt.

16. The transmission of claim 15 wherein said biasing means includes a torsion spring, said spring being wound around said bolt and including first and second arms, said first arm engaging said housing and said second arm engaging said brake lever at a position spaced from said mounting bolt.

17. The transmission of claim 16 wherein said housing includes a recess and said first arm extends into said recess.

18. The transmission of claim 10 wherein said bracket is mounted on said housing, and said bracket includes an elongated slot through which said brake lever upper portion extends.

19. The transmission of claim 18 wherein said bracket slot allows said brake lever to move substantially in only one direction.

20. The transmission of claim 19 wherein said brake lever has a thickness in a first direction about the thickness of said bracket slot, and said brake lever has a thickness in a second direction substantially greater than the thickness of said bracket slot whereby said brake lever is secured in an aligned position within said bracket slot.

21. A transmission comprising:

a housing;

a plurality of shafts rotatably disposed in said housing;

means for operably connecting said shafts;

a pivot attached to said housing; braking means for applying braking force to one of said shafts, said braking means connected to said housing and operable on one of said shafts, said braking means including a brake lever for applying the braking force, said brake lever having a lower portion mounted on said pivot and an upper portion; and means for actuating said braking means by moving said brake lever, said actuating means including linkage and a bracket, said linkage connected to said brake lever upper portion at a position substantially removed from said pivot, and said bracket mounted on said housing and having an elongated slot, said elongated slot receiving said brake lever upper portion and aligning said brake lever whereby the alignment of said brake lever is maintained.

* * * * *